S. L. TIMMONS.
CULTIVATOR.
APPLICATION FILED SEPT. 21, 1915.

1,299,064.

Patented Apr. 1, 1919.
3 SHEETS—SHEET 1.

WITNESSES

INVENTOR
Sanford S. Timmons
BY
ATTORNEY

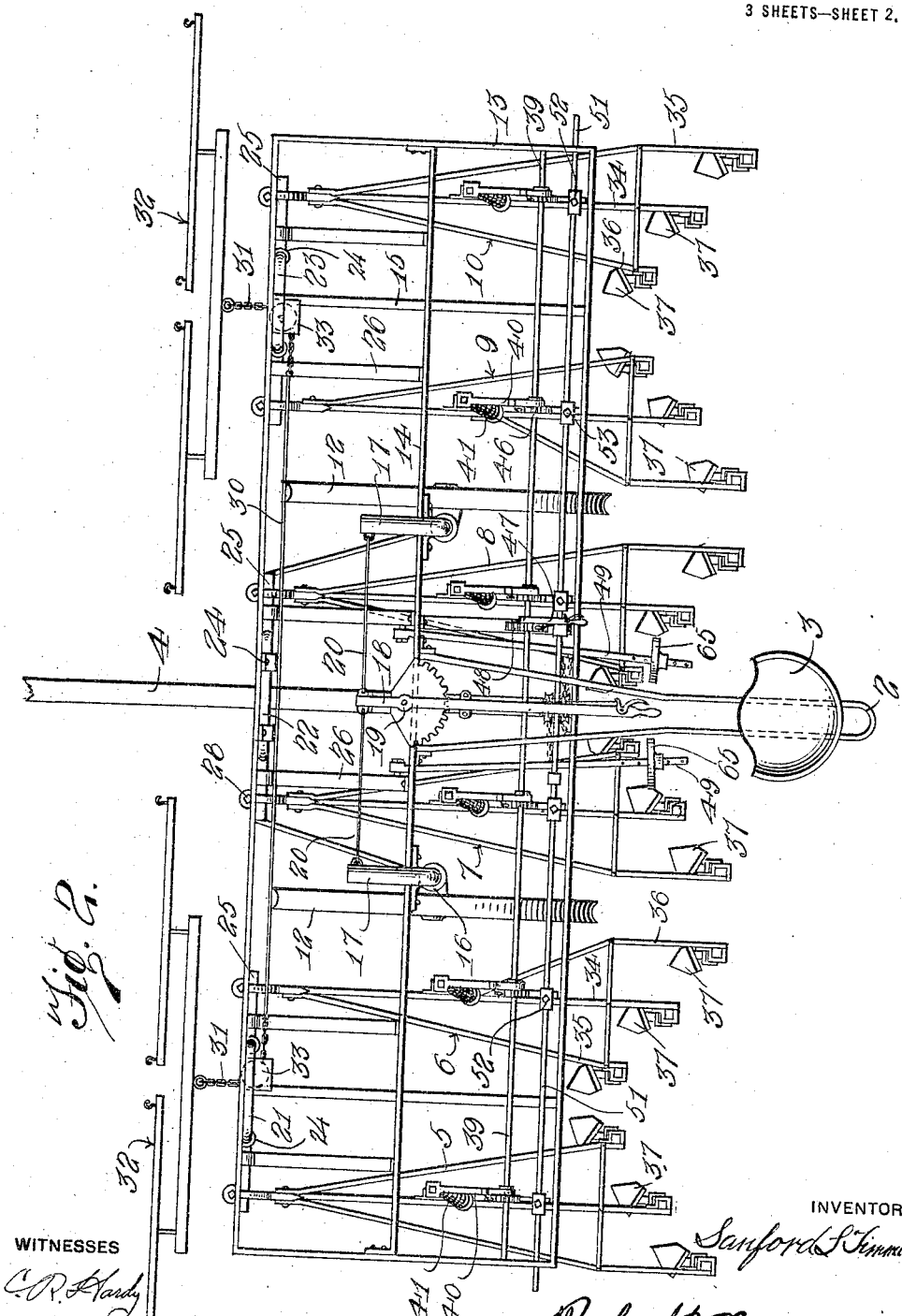

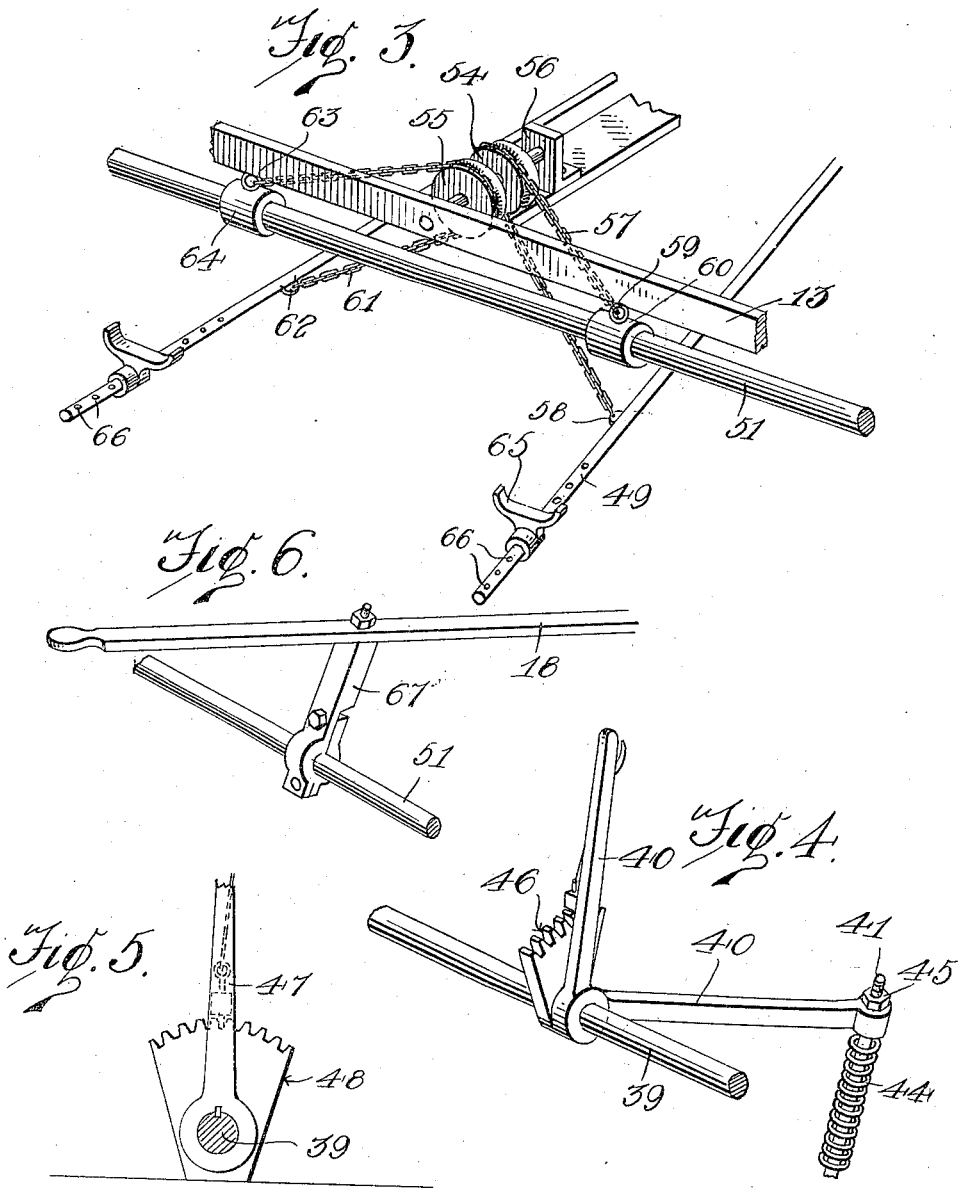

UNITED STATES PATENT OFFICE.

SANFORD L. TIMMONS, OF DES MOINES, IOWA.

CULTIVATOR.

1,299,064.     Specification of Letters Patent.     Patented Apr. 1, 1919.

Application filed September 21, 1915. Serial No. 51,855.

*To all whom it may concern:*

Be it known that I, SANFORD L. TIMMONS, citizen of the United States, residing at Des Moines, in the county of Polk and State of Iowa, have invented certain new and useful Improvements in Cultivators, of which the following is a specification.

My invention relates to agricultural machinery and more particularly to an improved multi-row cultivator of the riding type.

An object of the invention is to provide a three-row cultivator wherein the "hitch" is so arranged with respect to the cultivator frame as to require the use of but four draft animals.

A further object of the invention is to provide a cultivator wherein adjustment of the gangs vertically or laterally may be obtained in a novel and peculiar manner, and with facility, accuracy and ease.

A still further object of the invention is to provide a three-row cultivator wherein the operator is so situated with respect to the intermediate plant row as to ride directly thereover and thus facilitate proper operation of the machine.

I also contemplate a means whereby the penetrating depth of the cultivator shovels may be maintained uniform while operating upon uneven or hilly ground.

I further contemplate a wheeled cultivator of a construction whereby certain of the gangs are disposed to operate beyond or at the outside of the supporting wheels and the remainder therebetween.

I still further contemplate a seat support of a construction permitting adjustment of the seat to properly balance the machine and a foot lever arrangement of a construction permitting corresponding adjustment of the foot engaging devices that said lever arrangement may be readily controlled.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:

Fig. 2 is a top plan view;

Fig. 3 is a detail perspective view of the foot lever arrangement;

Fig. 4 is a detail perspective view of one of the levers used to individually adjust the gangs;

Fig. 5 is a detail elevation, partly in section, of the hand controlled lever utilized to simultaneously and vertically adjust the several gangs; and Fig. 6 is a detail perspective view of an attachment in the nature of a modification.

Figure 1:
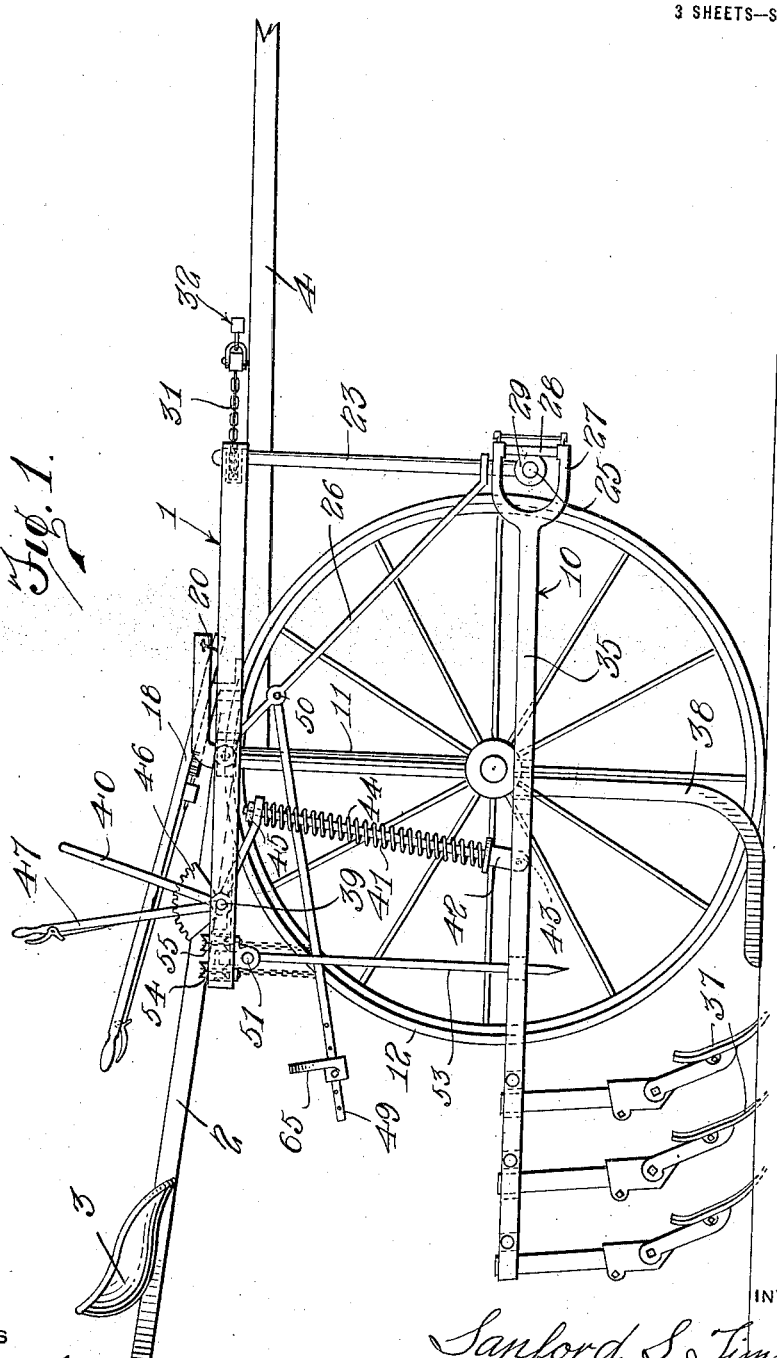
Figure 1 is a side elevation of a three-row cultivator constructed in accordance with the invention hereinafter claimed.

Before proceeding with a description of the drawings I desire to call particular attention to the fact that while I have evolved my invention with reference to its use as a machine for cultivating corn, the same, if desired, may be used, and with equal efficacious results, as a machine for cultivating beans, peas, cotton and analogous plants or crops.

Referring now to the drawings by numerals, 1 designates as an entirety the machine frame, 2 the seat support, 3 the operator's seat, 4 the draft tongue, 5, 6, 7, 8, 9 and 10 the several gangs, 12—12 the supporting wheels, and 11—11 vertical axles therefor.

The machine frame 1 in its preferred embodiment may be said to consist of a substantially rectangular outer frame portion 13, a central beam 14 extended longitudinally of the frame and a plurality of transverse beams 15. Bearings 16 are secured, one to each of the wheel axles 11 that said wheel axles may be properly supported in the desired spaced relation. An angle or steering arm 17 is formed on the upper end of each wheel axle that the supporting wheels 12—12 may be moved (as the machine is turned) in unison. An operating lever 18 is pivoted as at 19 to the machine frame and to operate transversely thereof in a substantially horizontal plane. Rods 20 connect the respective steering arms 17 with the forward end of said lever. Lock mechanism of the sliding pawl and quadrant type is to be associated with the lever 18 for an obvious purpose.

Arched supports 21, 22 and 23 are secured to the frame 1 by means of suitable fastening means indicated at 24 and these supports are held in uniform spaced relation and in such proximity as to straddle the three plant rows under cultivation. Each of the mentioned supports is of an inverted U-shape formation, the parallel arms of each support terminating in opposed angle arms or extensions 25. The angle arms or extensions formed on the support 21 mount the gangs 5 and 6, the angle arms or extensions 25 on the support 22 mount the gangs 7 and 8 and the angle arms or extensions 25 on the support 23 mount the gangs 9 and 10. Braces 26 are hung from the main frame 1 to engage with the extensions 25 of the support 22 that the latter may be at all times maintained in the position desired. Similar braces 26 are connected to the supports 21 and 23.

That vertical and lateral adjustment of the several gangs may be obtained, each gang is bifurcated or forked at its forward end as indicated at 27 to engage with a pivot pin 28 therefor. Said pin 28 is made integral with or secured to a suitable frame 29 in turn disposed for engagement with one of the extensions 25.

Coming now to a description of the hitch mechanism, 30 designates a hitch rod mounted forwardly of the frame to bodily move longitudinally thereof. Draft appliances, designated each as an entirety by the numeral 32 (one draft appliance for each draft animal) are connected through the medium of chains 31 with the rods 30, the said appliances being disposed one at each side of the draft tongue 4 and in such relation as to dispose the draft animals (preferably four in number) one between and at each side of the three plant rows under cultivation. The chains 31 operate over pulleys 33 disposed, one adjacent each of the respective arch supports 21 and 22 that the draft may be equalized and the pull distributed uniformly throughout the cultivator frame.

Each of the mentioned gangs 5, 6, 7, 8, 9 and 10 comprises a central beam 34, an outside angular beam 35 and an inside angular beam 36, the several beams each mounting a detachable tooth or shovel 37 which, collectively, are disposed, one in advance of the other and at a slight angle to the vertical. A shoe or runner 38 is hung to depend from each gang that the penetrating depth of the shovel 37 may be at all times maintained uniform and especially when operating upon uneven or hilly ground. The runners 38 are disposed forwardly of the shovels as illustrated to advantage in Fig. 1.

Proceeding now with a description of the adjustment means for the several gangs, 39 designates a shaft mounted at the rear of the machine frame to extend longitudinally thereof. A plurality of substantially bell crank levers 40 are loosely mounted on the shaft 39, one directly above each of the mentioned gangs. The said levers 40 are operable to individually and vertically adjust said gangs. The construction of the associate mechanism for each lever 40 being a duplicate, a description of but one of said mechanisms will ensue. A rod 41 is mounted to engage at one end with the bell crank lever 40 and at its opposite end an abutment member 42 pivoted as at 43 to its associate gang. A spring 44 is mounted to embrace the rod 41 and to abut respectively the lever 40 and the member 42 that a certain amount of pressure may be at all times exerted on each gang. The tension of the spring 44 may be varied through adjustment of a nut 45 mounted on the threaded end of the rod 41. A lock means of the sliding pawl and quadrant type (designated 46) is provided for each lever 40 for an obvious purpose in which the quadrants are rigidly secured to the shaft 39 for engagement by locking mechanism of said levers.

Individual vertical adjustment of the several gangs being obtainable through manipulation of the levers 40, simultaneous vertical adjustment of the several gangs must be obtained through a different source. As a means whereby said simultaneous adjustment is obtained, I provide a lever 47, and a lock means 48 therefor including a quadrant mounted on the frame, the lever being rigidly secured. Said lever 47 is located in proximity to the operator's seat, and when manipulated, will rotate shaft 39 to either simultaneously raise or simultaneously lower the several gangs.

Lateral adjustment of the gangs is obtained through the medium of the crank arm 40 and rods 41, which rods are connected to the gangs through manipulation of foot levers 49—49 disposed, one at each side of the seat support and in a plane therebeneath, each of the mentioned levers having connection as at 50 with the centrally disposed braces 26. What I shall term a shifting shaft 51 is mounted at the rear of the frame 1 to extend in parallelism with the shaft 39. Collars 52 are mounted on the shaft 51, one for each gang. Rods 53 depend from the respective collars 52 to engage with the several gangs that the latter may be shifted laterally through corresponding movement of the shaft. The connection between the rods 53 and the several gangs is such as to in no way interfere with vertical adjustment of said gangs as hereinbefore described.

Pulleys 54 and 55 are mounted on a shaft 56 journaled in bearings therefor formed by the machine frame 1. A chain 57 is secured at one end as at 58 to one of said foot levers 49 and at its opposite end as at 59 to a collar 60 on the shaft 51. Said chain 57 is mounted to operate over and in unison with the pulley 54 that movement of the said lever 49 to the right will cause the shaft 51 to be accordingly moved in a counter direction. A chain 61 is connected at one end as at 62 to the other of the said levers 49 and at its opposite end as at 63 to a collar 64 likewise mounted on the shaft 51. Said chain 61 is mounted to operate over and engage with the pulley 55 that movement of the last mentioned lever to the left will cause said shaft to accordingly move to the right. Foot engaging devices 65 are mounted, one on each of the levers 49 that manipulation of said levers may be subjected to foot control. Each of the foot levers 65 is adjustable longitudinally of its associate lever. Apertures 66 are formed in the levers 49 that the mentioned adjustment of the devices 65 may be obtained.

From the foregoing description, taken in connection with the accompanying drawings it is evident that the cultivator herein described will prove a time saving and labor saving machine; that the draft animals operate between each of the several plant rows (but four being required); and that the spring 44 will individually yield should the shovel 37 forming a part thereof contact with a stone, rock or other non-yielding object.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

In a three-row cultivator, a frame, a plurality of plow beams, means connecting the forward ends of said beams to the frame for horizontal and vertical motion, each plow beam having a vertical opening formed therein, a bar, a plurality of brackets mounted on the frame to support the bar for longitudinal and rotary movement, a plurality of vertical rods depending from said bar, and entering at their lower ends the openings of the plow beams a pair of vertically movable foot pedals mounted on the frame, pulleys mounted on the frame, flexible elements trained over said pulleys, and connecting the foot pedals with the bar, whereby to shift said bar longitudinally in one direction or the other upon a movement of the pedals in opposite directions, to move all the plow beams simultaneously and laterally, and means for moving the plow beams individually or simultaneously in a vertical direction.

In testimony whereof I affix my signature in presence of two witnesses.

SANFORD L. TIMMONS.

Witnesses:
 EDNA E. TIMMONS,
 FRED. A. UTTERBACK.

Copies of this patent may be obtained for five cents each, by addressing the "Commissioner of Patents, Washington, D. C."